United States Patent
Naik et al.

(10) Patent No.: US 10,921,127 B2
(45) Date of Patent: Feb. 16, 2021

(54) AUGMENTED REALITY BASED ELECTRONIC DEVICE TO PROVIDE LOCATION TAGGING ASSISTANCE IN AN INDOOR OR OUTDOOR AREA

(71) Applicant: SONY CORPORATION, Tokyo (JP)

(72) Inventors: Sunil Naik, Bangalore (IN); Nagnath Chippa, Bangalore (IN); Mugdha Bhat, Bangalore (IN); Sekhar Sarma, Bangalore (IN); Shejashree Shetty, Bangalore (IN)

(73) Assignee: SONY CORPORATION, Tokyo (JP)

( * ) Notice: Subject to any disclaimer, the term of this patent is extended or adjusted under 35 U.S.C. 154(b) by 321 days.

(21) Appl. No.: 15/801,740

(22) Filed: Nov. 2, 2017

(65) Prior Publication Data

US 2019/0128676 A1    May 2, 2019

(51) Int. Cl.
| | |
|---|---|
| *G01C 21/20* | (2006.01) |
| *G06T 7/246* | (2017.01) |
| *G06T 7/73* | (2017.01) |
| *G06T 7/60* | (2017.01) |
| *G06T 19/00* | (2011.01) |

(52) U.S. Cl.
CPC ............ *G01C 21/206* (2013.01); *G06T 7/248* (2017.01); *G06T 7/60* (2013.01); *G06T 7/74* (2017.01); *G06T 19/006* (2013.01); *G06T 2207/10028* (2013.01); *G06T 2219/004* (2013.01)

(58) Field of Classification Search
CPC ......... G01C 21/206; G06T 7/248; G06T 7/74; G06T 7/60; G06T 19/006; G06T 2219/004; G06T 2207/10028
See application file for complete search history.

(56) References Cited

U.S. PATENT DOCUMENTS

| | | | |
|---|---|---|---|
| 8,711,206 B2 | 4/2014 | Newcombe et al. | |
| 8,860,760 B2* | 10/2014 | Chen et al. | G06T 19/006 382/103 |
| 9,058,686 B2* | 6/2015 | Sakurai et al. | G06T 19/006 |
| 9,088,787 B1 | 7/2015 | Smith et al. | |
| 9,401,048 B2 | 7/2016 | Maciocci et al. | |
| 10,067,737 B1* | 9/2018 | Ozery | G06T 19/006 |
| 2013/0083011 A1* | 4/2013 | Geisner et al. | G06T 19/006 345/419 |
| 2013/0293468 A1* | 11/2013 | Perez et al. | G06T 19/006 345/158 |
| 2014/0067768 A1* | 3/2014 | Fateh et al. | G06T 19/006 707/684 |
| 2014/0375684 A1 | 12/2014 | Algreatly | |

(Continued)

*Primary Examiner* — Dale W Hilgendorf
(74) *Attorney, Agent, or Firm* — Chip Law Group

(57) ABSTRACT

An augmented reality based electronic device to provide location tagging assistance in an indoor or outdoor area, comprises an image-capture unit, a depth sensor, and circuitry. The circuitry determines a first reference point in a defined indoor area based on a selection of a first location on an application interface rendered at the first electronic device. A second location of the first electronic device in the defined indoor area may be computed based on the track of a relative motion from the first reference point. Output of first augmented reality content for at least a first object viewed through the image-capture unit in the defined indoor area, may be controlled based on a first position of the first object in a specified geographic coordinate system.

25 Claims, 9 Drawing Sheets

(56) References Cited

U.S. PATENT DOCUMENTS

| | | | |
|---|---|---|---|
| 2015/0012426 A1* | 1/2015 | Purves et al. | G06T 19/006 705/41 |
| 2015/0170256 A1* | 6/2015 | Pettyjohn et al. | G06T 19/006 705/14.49 |
| 2015/0172373 A1* | 6/2015 | Watanabe | H04L 46/10 709/217 |
| 2015/0193982 A1* | 7/2015 | Mihelich et al. | G06T 19/006 345/633 |
| 2015/0289113 A1 | 10/2015 | Cochran et al. | |
| 2015/0310310 A1* | 10/2015 | Hesch et al. | G06T 7/74 382/103 |
| 2016/0071325 A1* | 3/2016 | Callaghan | G06T 19/006 345/633 |
| 2016/0148433 A1* | 5/2016 | Petrovskaya et al. | G06T 19/006 345/633 |
| 2016/0191772 A1 | 6/2016 | Jordan | |
| 2016/0345137 A1* | 11/2016 | Ruiz | H04W 4/027 |
| 2017/0168585 A1* | 6/2017 | Faaborg et al. | G06T 19/006 |
| 2017/0200048 A1* | 7/2017 | Yamada | G01C 21/206 |
| 2017/0206691 A1* | 7/2017 | Harrises et al. | G06T 11/60 |
| 2017/0337352 A1* | 11/2017 | Williams | G06T 19/006 |
| 2017/0364153 A1* | 12/2017 | Kazansky et al. | G06T 19/006 |

* cited by examiner

AUGMENTED REALITY BASED ELECTRONIC DEVICE TO PROVIDE LOCATION TAGGING ASSISTANCE IN AN INDOOR OR OUTDOOR AREA

CROSS-REFERENCE TO RELATED APPLICATIONS/INCORPORATION BY REFERENCE

None.

FIELD

Various embodiments of the disclosure relate to augmented reality based systems. More specifically, various embodiments of the disclosure relate to an augmented reality based electronic device to provide location tagging assistance in an indoor or outdoor area.

BACKGROUND

Recent advancements in the field of sensor and computer technology have extended the functionalities of various electronic devices, applications, and navigation systems. Existing technologies, such as a map-based navigation assistance, provide limited cues about a user's present location and information about areas within the vicinity of the user. Typically, a portable electronic device, such as a smartphone, is equipped with various sensors, such as a Global Positioning System (GPS) sensor, which aid in providing the map-based navigation assistance. However, the existing systems and applications that use the GPS sensor may fail to provide a precise location of an electronic device. Further, for indoor areas, the satellite signals received by the GPS sensor may be comparatively weaker than the ones received in the outdoor areas. As a result, error in location estimation by the GPS sensor may be further aggravated.

In certain scenarios, a user may come across certain unknown objects in an indoor/outdoor area. In certain other scenarios, the user may desire to get acquainted with an object in the indoor/outdoor area or seek certain information about an object-of-interest therein. Current geo-tagging systems may be used to geo-tag a particular location in a map, however, such geo-tags provide static and limited information, specifically, for known objects (such as known points-of-interest). Further, as a result of certain inherent errors in the detected locations by the GPS sensors, the current geo-tagging systems may be incapable of tagging one or more closely spaced objects. Thus, it may be difficult to readily get acquainted with an unknown object in the indoor/outdoor area or geo-tag an object in the indoor/outdoor area with existing systems and technologies.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An augmented reality based electronic device to provide location tagging assistance in an indoor or outdoor area substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1A:
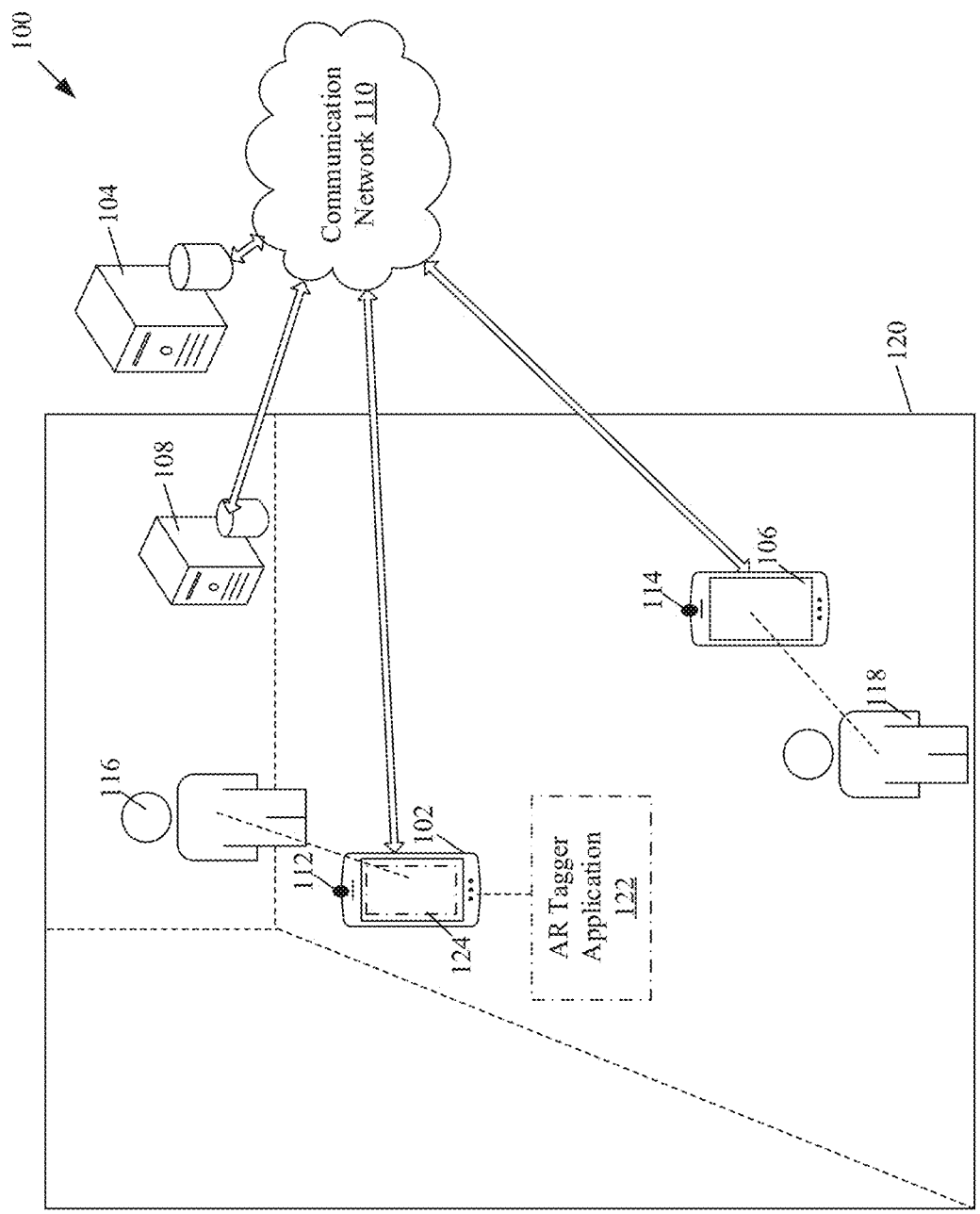
FIG. 1A illustrates an exemplary network environment for an augmented reality based electronic device to provide location tagging assistance in an indoor or outdoor area, in accordance with an embodiment of the disclosure.

The following described implementations may be found in the disclosed augmented reality based electronic device to provide location tagging assistance in an indoor or outdoor area. Exemplary aspects of the disclosure may include a first electronic device comprising an image capture unit, a depth sensor, and circuitry. The circuitry may be configured to determine a first reference point in a defined indoor area based on a selection of a first location on an application interface rendered at the first electronic device. The circuitry may be further configured to track a relative motion of the first electronic device in the defined indoor area with respect to the determined first reference point. The circuitry may be configured to compute a second location of the first electronic device in the defined indoor area based on the tracked relative motion from the first reference point. The circuitry may be configured to control output of first augmented reality content for at least a first object viewed through the image-capture unit in the defined indoor area, based on a first position of the first object in a specified geographic coordinate system. The first position of the first object in the specified geographic coordinate system may be computed based on depth information of the first object acquired from the depth sensor at the second location, the second location, and the first reference point.

In accordance with an embodiment, the first augmented reality content related to the first object corresponds to at least one of a user-defined annotation, a unique fragrance code (UFC), a three-dimensional (3D) audio, an informative image, or an informative video related to the first object. The first electronic device may further comprise a location sensor. The first location selected on the application interface corresponds to a calibrated user-location from an initial location acquired from the location sensor.

In accordance with an embodiment, the circuitry is further configured to control display of world map texture and digital terrain elevation data (DTED) on the application interface. The circuitry may be configured to control the display based on the initial location acquired from the location sensor to allow the selection of the first location on the application interface rendered at the first electronic device. In accordance with an embodiment, the circuitry is further configured to determine whether a local three-dimensional (3D) scene map is available for the defined indoor area based on the first location.

In accordance with an embodiment, the circuitry is further configured to superimpose the local 3D scene map on the application interface to provide an indoor navigation guidance to a user of the first electronic device in the defined indoor area based on the track of the relative motion of the first electronic device from the first reference point. The circuitry is further configured to annotate a second object with second augmented reality content specific for the second object viewed through the image-capture unit in the defined indoor area. The annotation may be done based on selection of the second object in a video stream captured by the image-capture unit in an augmented reality (AR) tagger mode and a user-input.

The circuitry is further configured to associate an annotation of the second object with a second position in the specified geographic coordinate system of the defined indoor area. The circuitry is further configured to compute a distance from the first position of the first object to the second location of the first electronic device, based on the depth information of the first object acquired from the depth sensor at the second location from where the first object is viewed through the image-capture unit. The circuitry is further configured to create a local 3D scene map for the defined indoor area by an area learning operation, based on an absence of the local 3D scene map in a server that is communicatively coupled to the first electronic device.

In accordance with an exemplary aspect of the disclosure, the first electronic device may annotate one or more objects. In such a case, the circuitry may be configured to determine a first reference point in a defined indoor area based on a selection of a first location on an application interface rendered at the first electronic device. The circuitry may be configured to track a relative motion of the first electronic device in the defined indoor area with respect to the determined first reference point. The circuitry may be configured to compute a second location of the first electronic device in the defined indoor area based on the tracked relative motion from the first reference point. The circuitry may be further configured to annotate a first object with first augmented reality content specific for the first object that is viewed through the image-capture unit in the defined indoor area. The annotation may be done based on a first position of the first object in a specified geographic coordinate system. The first position of the first object in the specified geographic coordinate system may be computed based on depth information of the first object acquired from the depth sensor at the second location, the second location, and the first reference point.

FIG. 1A illustrates an exemplary network environment for an augmented reality based electronic device to provide location tagging assistance in an indoor or outdoor area, in accordance with an embodiment of the disclosure. With reference to FIG. 1A, there is shown an exemplary network environment 100. The exemplary network environment 100 may include a first electronic device 102, a first server 104, a second electronic device 106, and a second server 108. The first electronic device 102, the second electronic device 106, the first server 104 and the second server 108 may communicate with each other via a communication network 110. In some embodiments, the first electronic device 102 may comprise an integrated camera, such as a first image-capture unit 112. In some embodiments, the first image-capture unit 112 may be an external unit communicatively coupled to the first electronic device 102. The second electronic device 106 may include a second image-capture unit 114. The first electronic device 102 may be associated with a first user 116 and the second electronic device 106 may be associated with a second user 118. The first electronic device 102 and the second electronic device 106 may be located in a defined indoor area 120. An augmented reality (AR) tagger application 122 may be installed various electronic devices, such as the first electronic device 102, and the second electronic device 106. There is also shown an application interface 124 of the AR tagger application 122 rendered on the first electronic device 102.

Each of the first electronic device 102 and the second electronic device 106 may comprise suitable circuitry, interfaces, and/or code that may be configured to annotate one or more objects within the vicinity of the first electronic device 102 and/or the second electronic device 106. Each of the first electronic device 102 and the second electronic device 106 may comprise a location sensor, for example, a global positioning system (GPS) sensor. Further, each of the first electronic device 102 and the second electronic device 106 may also comprise a depth sensor, for example, an infrared based depth sensor. In some embodiments, the first electronic device 102 may further comprise an accelerometer to sense motion of the first electronic device 102. Examples of the first electronic device 102 and the second electronic device 106 may include, but are not limited to, a smartphone, a tablet, a head-mounted device (HMD), a smartglass, a digital camera, a camcorder, a laptop, an augmented reality-based portable device, a computing device, a server, and/or other consumer electronic (CE) devices.

The first server 104 may refer to a centralized server comprising suitable logic, circuitry, interfaces, and/or code that may be configured to receive a plurality of annotations associated with a plurality of objects within the defined indoor area 120 from the first electronic device 102 or the second electronic device 106. The first server 104 may be configured to store accurate location information of each of the plurality of objects even if the plurality of objects are close to each other, for example, less than 5 feet, within the defined indoor area 120. The location information may be stored in accordance with a World Geodetic System (WGS) that comprises a standard coordinate system for the Earth. In some embodiments, the location information may be stored in other coordinate system, such as Cartesian coordinate system, polar coordinate system, or a global positioning system based coordinate system. The first server 104 may comprise world map textures and digital terrain elevation data (DTED) for different earth regions or zones, countries, cities, and the like. World map textures and digital terrain elevation data associated with an area may be represented in first electronic device 102 as a three-dimensional model of elevations of multiple locations for a particular area of earth. For example, the digital terrain elevation data associated with an area may be represented as a digital elevation model (DEM), known in the art. In certain scenarios, a world map texture associated with the area may comprise a map of the area with appropriate representations of elevation of subregions, such as buildings, in the area. In certain scenarios, the elevations of sub-regions in the area may be represented as heights with respect to the sea level or center of origin of earth. Examples of the first server 104 may include, but are not limited to, an application server, a cloud server, a web server, a database server, a file server, a mainframe server, or a combination thereof.

The second server 108 may refer to a local server provided in the defined indoor area 120. The second server 108 may comprise suitable logic, circuitry, interfaces, and/or code that may be configured to store a local three-dimensional (3D) scene map of the defined indoor area 120 or other 3D physical world space. Examples of the second server 108 may include, but are not limited to, an application server, a web server, a database server, a file server, a mainframe server, or a combination thereof. In some embodiments, the second server 108 may further comprise annotations associated with one or more objects located within the defined indoor area 120. The annotations may comprise one or more AR content, such as informative video, audio, images, multi-channel audio, and Unique Fragrance codes (UFC) for certain objects in the defined indoor area 120. The UFC may be a code that represents a unique fragrance. Examples of UFC may include, but is not limited to a binary code, an alphanumeric code, and a hexadecimal code.

The communication network 110 may be at least one of the Internet, a cloud network, a Wireless Fidelity (Wi-Fi) network, a Personal Area Network (PAN), a Local Area Network (LAN), and/or a Metropolitan Area Network (MAN). Various devices in the exemplary network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZIGBEE®, EDGE, IEEE 802.11, IEEE 802.11b, IEEE 802.11g, IEEE 802.11n, and/or any other IEEE 802.11 protocol, multi-hop communication, wireless access point (AP), device to device communication, cellular communication protocols, Light-fidelity (Li-Fi), Internet-of-Things (IoT) network, or BLUETOOTH® (BT) communication protocols, or a combination or variants thereof.

Each of the first image-capture unit 112 and the second image-capture unit 114 may comprise suitable logic, circuitry, and/or interfaces that may be configured to capture a plurality of images. The first image-capture unit 112 may be integrated and/or communicatively coupled with the first electronic device 102. Similarly, the second image-capture unit 114 may be integrated and/or communicatively coupled with the second electronic device 106. Examples of implementation of the first image-capture unit 112 and the second image-capture unit 114 may include, but not limited to a time-of-flight (TOF) camera, a light field camera, a wide-angle camera, an external camera, an image sensor, a 360-degree camera, or a charge coupled devices (CCD) based-camera.

The defined indoor area 120 may refer to an area situated, conducted, or used within a building or under cover. For example, the defined indoor area 120 may be a shopping center at which different consumer goods (i.e. objects) may be displayed. In another example, the defined indoor area 120 may be a conference room, a house, an office area, and the like. The first user 116 may hold the first electronic device 102 and may move within the defined indoor area 120.

The AR Tagger application 122 may comprise suitable logic and/or code that may be configured to annotate one or more objects located within the vicinity of the first electronic device 102. The AR tagger application 122 may be further configured to present annotations associated with the one or more objects via the application interface 124. The AR tagger application 122 may be installed in the first electronic device 102.

In operation, the first electronic device 102 may be configured to receive an input to launch the AR tagger application 122 installed in the first electronic device 102. The first electronic device 102 may be configured to acquire a location of the first electronic device 102 by use of a location sensor provided in the first electronic device 102. The location of the first electronic device 102 acquired from the location sensor, such as the GPS sensor, may not be an accurate location. For example, in cases where the first electronic device 102 is located indoors, such as the defined indoor area 120, the location sensor may receive weak GPS signals from GPS satellites. Further, when signals from the GPS satellites bounce off buildings, the GPS sensor may be confused by the extra time the signal took to reach it. As a result, the location of the first electronic device 102 acquired from the location sensor may be inaccurate.

The first electronic device 102 may be configured to receive an input to select a first location on the application interface 124 rendered at the first electronic device 102. The first location selected on the application interface 124 may correspond to a calibrated user-location from the initial location acquired from location sensor. For example, the application interface 124 may render a map of the area around the acquired initial location from the location sensor. The first user 116 may select a first location, such as the user-calibrated location, on the application interface 124 of the first electronic device 102. The first location may include latitude, longitude, and height information. The first electronic device 102 may be further configured to mark the first location on the application interface 124. In accordance with an embodiment, the first electronic device 102 may be configured to determine a first reference point in the defined indoor area 120 based on the selection of the first location on the rendered application interface 124. Alternatively stated, the location coordinates for the first location may be marked by the first electronic device 102 as the first reference point for later use.

In accordance with an embodiment, the first electronic device 102 may be configured to track a relative motion of the first electronic device 102 in the defined indoor area 120 with respect to the determined first reference point. For example, the first user 116 may move from the first location (i.e. the first reference point) to a new location in the defined indoor area 120. In some embodiments, the first electronic device 102 may be configured to receive motion data indicative of motion of the first electronic device 102 from one or more movement tracker sensors provided in the first electronic device 102. The one or more movement tracker sensors may sense movement and/or orientation of the first electronic device 102 as the first electronic device 102 moves from one location to another location in the defined indoor area 120. Examples of the one or more movement tracker sensors may include, but are not limited to an accelerometer, a gyroscope, ultrasonic motion sensor, a compass, an orientation sensor, or a combination thereof.

In some embodiments, the first electronic device 102 may be configured to capture a plurality of images in the defined indoor area 120 by the first image-capture unit 112. The first electronic device 102 may be configured to process the plurality of images to estimate a linear or non-linear motion of the first electronic device 102 as the first electronic device 102 moves from one location to another location in the defined indoor area 120. For example, a focal length of a camera, such as the first image-capture unit 112, may be known at the time of the capture of the plurality of images. Further, one or more feature points may be captured from two different locations, for example, from the initial location and the new location of the first electronic device 102 as first electronic device 102 moves. Thus, based on the relative position of the different feature points in the captured the plurality of images, a distance covered by the first electronic device 102 may be computed. The change in size and relative position of the different feature points (provided the focal length is same) may indicate the distance covered by the first electronic device 102.

In accordance with an embodiment, the first electronic device 102 may be configured to search a local 3D scene map for the defined indoor area 120 stored in the second server 108. In cases where the local 3D scene map for the defined indoor area 120 is available, then the first electronic device 102 may retrieve the local 3D scene map from the second server 108. In cases where the local 3D scene map is unavailable, then the first electronic device 102 may be configured to create the local 3D scene map with an area learning operation. The creation of the local 3D scene map with the area learning operation is described in details, for example, in FIG. 1C.

In accordance with an embodiment, the first electronic device 102 may be further configured to compute a second location of the first electronic device 102 in the defined indoor area 120, based on the tracked relative motion of the first electronic device 102 from the first reference point. Alternatively stated, the first electronic device 102 may compute location coordinates of the second location from location coordinates of the first reference point and the tracked relative motion of the first electronic device 102 from the first reference point. Based on the distance and direction of motion from the first reference point to the second location of the first electronic device 102, the location coordinates of the second location may be estimated by use of coordinate geometry. The second location may be computed offline as the tracked relative motion of the first electronic device 102 is utilized for the computation of the second location. Thus, even if the location sensor may not be receiving GPS signals from the GPS satellites, the first electronic device 102 may still be able to compute the second location from the first reference point.

In certain scenarios, the first user 116 may come across certain unknown objects in defined indoor area 120. In certain other scenarios, the first user 116 may want to get acquainted with an object in the defined indoor area 120 or seek certain information about an object-of-interest. In such scenarios, the first user 116 may point the first image-capture unit 112 of the first electronic device 102 to capture a view of a scene that includes one or more objects. In accordance with an embodiment, the first electronic device 102 may be configured to present a live preview of the scene that comprises the one or more objects, via the application interface 124. For example, the one or more objects may be inanimate objects, such as consumer goods, a furniture, a physical portrait, and the like. The first electronic device 102 may be configured to receive an input to select the first object from the one or more objects in the live preview, via the application interface 124, to generate an AR view.

In accordance with an embodiment, the first electronic device 102 may be configured to acquire depth information of the selected first object with respect to the first electronic device 102, from the depth sensor. For example, the first user 116 may be located at the second location while the first image-capture unit 112 is pointed towards the scene. A distance of the selected first object from the first electronic device 102 at the second location may be calculated based on the acquired depth information. In cases where the selected first object, includes multiple depth values, an average depth value, may be considered for the computation of the distance of the selected object from the second location of the first electronic device 102. In some embodiments, the farthest or the nearest depth value associated with the selected first object may be considered for the computation of the distance of the selected object. The farthest or the nearest depth value may be considered with respect to the first electronic device 102.

In accordance with an embodiment, the first electronic device 102 may be further configured to compute a first position of the first object in a specified geographic coordinate system, for example, the WGS coordinates. The first position in the specified geographic coordinate system may be computed based on depth information of the first object acquired from the depth sensor at the second location, the second location, and the first reference point. For example, a position vector originating from the second location of the first electronic device 102 to the first object at the first position, may be computed. In one example, the position vector may indicate a direction of the first object with respect to the first electronic device 102, and distance of the first object from the first electronic device 102. For example, the position vector may indicate that the first object is located at a specified distance (for example 3 meters) and in a certain angle towards a specified direction (for example east) of the first electronic device 102.

In accordance with an embodiment, the first electronic device 102 may be configured to control output of a first augmented reality content in the application interface 124 based on the first position of the first object in the defined indoor area 120. After an accurate position (or location) of the first object is mapped to the specified geographic coordinate system, the first augmented reality content associated with the first object may be retrieved from the first server 104 using the first position.

In accordance with an embodiment, the first augmented reality content related to the first object may correspond to at least one of a user-defined annotation, a unique fragrance (based on UFC), a 3D audio, a 360-degree image, a 360-degree video, a textual data item, a user tag, a label, an informative image, or an informative video related to the first object. The user-defined annotation may comprise text overlaid on the first preview rendered on the application interface 124 indicating information associated with the first object. For example, if the first object in the first preview is a camera, the user defined annotation may comprise a text "DSLR CAMERA, 12 MegaPixel, $750" displayed as the first AR content on the application interface 124.

The UFC may refer to code that indicates a defined or a unique fragrance or smell. The fragrance indicator device may be configured to produce one or more fragrances based on the corresponding UFCs. For example, if the first object is a rose flower, then the fragrance indicator device may generate an olfactory environment near the user of the fragrance indicator device based on the UFC to indicate a smell of a rose flower.

The 3D audio may be a multi-channel audio stream playable by a multi-channel speaker system or the first electronic device 102 to generate an acoustic environment around a user, such as the first user 116. The 3D audio may be recorded by a different user, such as the second user 118, previously for the first object and associated with the first position, by use of an AR application similar to the AR tagger application 122. The informative audio may comprise audio-based and the informative video may comprise the video based information associated with the first object. The first server 104 may be the centralized server that provides a social AR platform, where millions of users may contribute AR contents in the form of user-annotations, such as object tagging, 3D audio, UFC, a 360-degree image, a textual data item, an informative audio or video (for example, 360 video). Each annotated AR content may be mapped to a particular location in the specified geographic coordinate system (e.g. the WGS), which may be retrieved for later use.

The augmented reality content related to the first object may further have one of a public access level, a private access level, and/or a group based access level. The augmented reality content with the private access level may be consumed (i.e., viewed, heard or smelled) exclusively in a personal 3D physical world space, such as an office area which is restricted for public use, or accessible to certain dedicated teams. In some embodiments, the private access level may refer to tags or annotations which may be accessed exclusively by a user who has annotated the first object. The augmented reality content with the group based access level may be consumed (i.e., viewed, heard or smelled) by users designated by the user who has annotated the first object. The augmented reality content with the public access level may be consumed (i.e., viewed, heard or smelled) by any user.

In accordance with an embodiment, the first electronic device 102 may be configured to control output of the first augmented reality content in the application interface 124 based on the first position of the first object in the defined indoor area 120. If the first augmented reality content is a user-defined annotation, an informative image, and/or an informative video, then the first electronic device 102 may be configured to superimpose a label comprising the first augmented reality content, on a preview, such as the live preview, of the first object displayed on the application interface 124. The first electronic device 102 may be configured to control output by adjusting resolution, size, color, and shape of the label.

In accordance with an embodiment, in case where the first augmented reality content is a user-defined annotation, an informative image, and/or an informative video, then the first electronic device 102 may be configured to superimpose first augmented reality content on in the proximity of the first object in the preview displayed on the application interface 124. The first electronic device 102 may be configured to control output by adjusting resolution, size, color, and shape of the label. In certain scenarios, the first augmented reality content may be a 3D audio related to the first object. In such a case, the first electronic device 102 may be configured to control the output of the first augmented reality content by generating an acoustic environment around the first user 116 who may be equipped with the first electronic device 102.

In certain scenarios, the first augmented reality content may not be available for the first object. In such scenarios, the first electronic device 102 may be configured to annotate the first object. The first electronic device 102 may be configured to annotate the first object with one of a user-defined annotation, a UFC, the 3D audio, the textual data item, the 360-degree video, the 360-degree audio, the informative image, and/or the informative video related to the first object. The first electronic device 102 may annotate the first object based on the first position of the first object in the specified geographic coordinate system. In one example, the first electronic device 102 may present a list of fragrances on the application interface 124. The first user 116 may select a fragrance from the list of fragrances to indicate the fragrance experienced by the first user 116 within the vicinity of the first object. In another example, the first electronic device 102 may include a fragrance indicator device. The fragrance indicator device may be configured to sense a fragrance within the vicinity of the first object and store the sensed fragrance as a UFC. The sensed fragrance may be reproduced by the fragrance indicator device at a later point in time using the stored UFC. The UFC may then be associated with the first position (of the first object) that is mapped to the specified geographic coordinate system (i.e. the standard earth coordinate). The first electronic device 102 may be configured to communicate the UFC to the first server 104. At a later point in time, if other users, such as the second user 118, point the second image-capture unit 114 of the second electronic device 106, the second electronic device 106 may be configured to retrieve the UFC for the first object based on the first position of the first object mapped in the specified geographic coordinate system. In some embodiments, the fragrance indicator device may be provided in each of the first electronic device 102 and the second electronic device 106. The fragrance indicator device may further be configured to produce one or more fragrances based on the UFC. In such embodiments, the retrieved UFC may cause the fragrance indicator device to produce a specific fragrance that may be same or similar to the fragrance represented by the UFC.

In certain scenarios, the first electronic device 102 may be configured to annotate the first object with an informative media content, such as an informative video, informative image and/or and informative audio content. In one example, the first electronic device 102 may present a list of informative media content on the application interface 124. The first user 116 may select a media content from the list of informative media content. The first electronic device 102 may store the selected media content as annotation for the first object. In some embodiments, the first electronic device 102 may be configured to communicate the annotation to the first server 104.

In accordance with an embodiment, the first electronic device 102 may be configured to generate an alert by use of the AR tagger application 122 for AR content available in the current location of the first user 116. In some embodiments, the first electronic device 102 may be configured to generate an alert by use of the AR tagger application 122 to warn the first user 116 about unsafe locations, for example, a particular portion in a floor, or a particular floor in a building which may be unsafe to visit. In accordance with an embodiment, a location of personal objects, for example, a pen drive, a car key, a watch, a smartphone, and the like, may be tagged or annotated by use of the AR tagger application 122, which may then be used to quickly find those personal objects by use of the AR tagger application 122, which guides a user, such as the first user 116, to an exact location of those personal objects in the defined indoor area 120. Similarly, in certain scenarios, a location of a personal vehicle (such as a car) in a parking area may be tagged or annotated by use of the AR tagger application 122 by the first user 116 and mapped to a standard earth coordinate (e.g. WGS). For example, the parking area may be at $3^{rd}$ floor (level) of a building. Thus at a later point in time, the first user 116 may quickly find the precise location of the parked vehicle based on the mapping of the location of the personal vehicle to the standard earth coordinate by use of the AR tagger application 122.

In some embodiments, location and product information (e.g. price and sales pitch or advertisement specific for a product), associated with various consumer goods in a super market may be tagged or annotated by use of AR tagger applications (such as the AR tagger application 122). The location of each consumer good and the corresponding product information which may be stored in the second server 108 (or the first server 104), may be then used to quickly find those consumer goods in the supermarket, by use of AR tagger applications. The AR tagger applications, such as the AR tagger application 122, may not only guide a user, such as the first user 116, to an exact location of those consumer goods in the supermarket but also provide value-added and informative annotation related to different consumer goods to help in making a buying decision.

In accordance with an embodiment, the defined indoor area 120 may be a conference room. In such a case, different seats in as the conference room may be tagged or annotated by the first user 116 such that when a new user, such as the second user 118, enters the conference room, the new user may readily identify a seat meant for that new user. For example, different seats in the conference room may be tagged or annotated by use of the AR tagger application 122 by the first user 116 based on a seating arrangement specified for one or more conference attendees. For example, a seat in the defined indoor area 120, which is reserved for the new user such as the second user 118, may be annotated with a name of the new user. Different conference attendees in the conference room may identify seats reserved for each of the respective attendee by use of their electronic devices that may include an AR tagger application similar to the AR tagger application 122.

In one example, a certain spot within the defined indoor area 120 may be tagged or annotated with a panoramic media content (such as a panoramic 360-degree video, 360-degree audio, and/or a panoramic 360-degree image). The spot may be visible on a live preview of a scene rendered on the application interface 124 to allow the tagging or annotation by the first user 116 using the AR tagger application 122. The annotation associated with spot (i.e. a particular location coordinate) may be stored at the first server 104. The panoramic media content, for example, a sunset view, or different views of the same location at different time-of-day, may be retrieved by another electronic device (such as the second electronic device 106), by an AR tagger application when the second user 118 is present on the spot or points the second electronic device 106 towards the spot to capture a scene of the spot. Examples of the panoramic media content may include, but is not limited to a panoramic 360 video, an audio, an image, or a combination thereof.

Figure 1B:
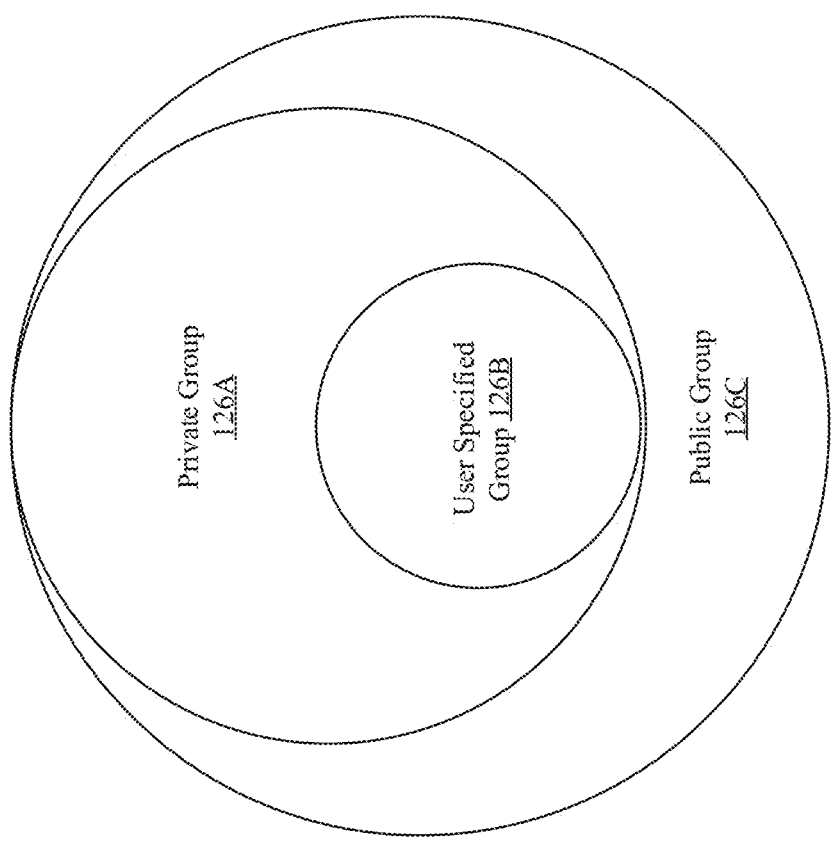
FIG. 1B illustrates an access-level based classification of augmented reality based content, in accordance with an embodiment of the disclosure.

FIG. 1B illustrates an access-level based grouping of augmented reality based content, in accordance with an embodiment of the disclosure. FIG. 1B is explained in conjunction with elements from FIG. 1A. With reference to FIG. 1B, there is shown a private group 126A, a user-specified group 126B, and a public group 126C. The private group 126A may include the augmented reality content associated with the private access level. The augmented reality content with the private access level may be consumed (i.e., viewed, heard or smelled) exclusively in a personal 3D physical world space, such as an office area which is restricted for public use, or accessible to certain specific individuals or dedicated teams based on need-to-know basis. The user-specified group 126B may include augmented reality content associated with the group based access level. The augmented reality content with the group based access level may be consumed (i.e., viewed, heard or smelled) by users designated by the user who has annotated the first object. The public group 126C may include augmented reality content with public access level. The augmented reality content with the public access level may be consumed (i.e., viewed, heard or smelled) by any user. The access levels, such as the private access level, the group based access level, and the public access level, for private group 126A, the user-specified group 126B, and the public group 126C respectively may be specified at the time of annotation using the AR tagger application 122.

Figure 1C:
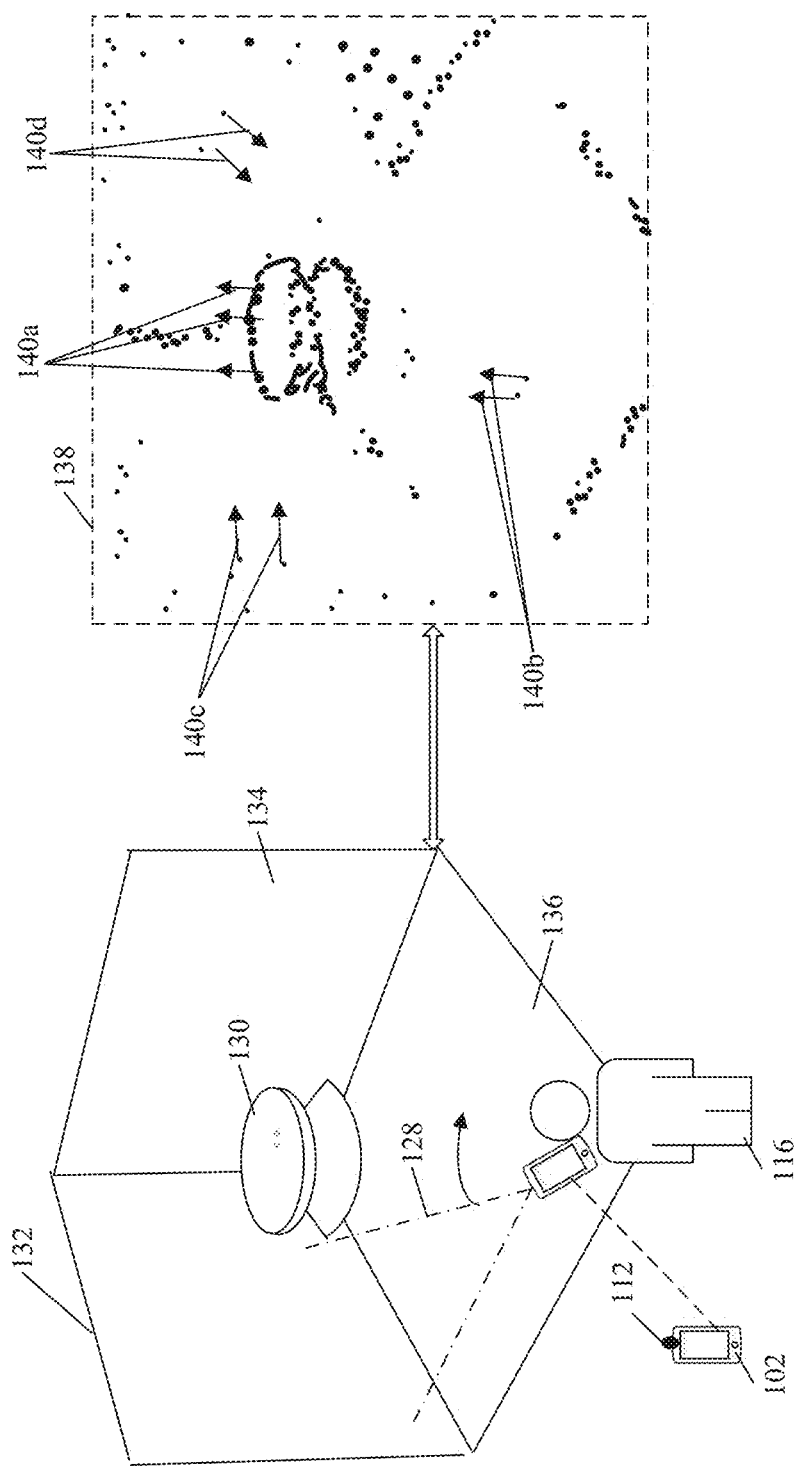
FIG. 1C illustrates an exemplary scenario for implementation of the disclosed augmented reality based electronic device to provide location tagging assistance in an indoor or outdoor area, in accordance with an embodiment of the disclosure.

FIG. 1C illustrates an exemplary scenario for implementation of the disclosed augmented reality based electronic device to provide location tagging assistance in an indoor or outdoor area, in accordance with an embodiment of the disclosure. FIG. 1C is explained in conjunction with elements from FIGS. 1A and 1B. With reference to FIG. 1C, there is shown a first room comprising a first object 130, a first wall 132, a second wall 134, and a floor 136. The first user 116 may point the first electronic device 102 towards a certain portion of the first room. Further, the first user 116 may pan a field-of-view 128 of the first image-capture unit 112 from one portion to other portion of the first room. The first electronic device 102 may be configured to capture a set of images of the first room, while the first user 116 pans the first electronic device 102 from one direction to another (for example, from left to right). The first electronic device 102 may be configured to generate a point cloud 138 of the 3D scene based on the captured set of images. The points in the point cloud 138 may be generated from the captured set of images based on estimation of lines/edges in the captured set of images.

The first electronic device 102 may be configured to determine different sets of surface normals 140*a* to 140*d* for each surface plane represented by the generated point cloud 138. For example, a table top surface of the first object 130 may be first surface plane that may have a first set of surface normals 140*a* pointing towards the ceiling. Similarly, a floor surface of the floor 136 may be a second surface plane that may have a second set of surface normals 140*a* which may also point towards the ceiling. Similarly, the wall surfaces of the first wall 132 and the second wall 134 may represent a third surface plane and a fourth surface plane respectively. Thus, a third set of surface normals 140*c* and a fourth set of surface normals 140*d* are shown extending from their respective wall surfaces.

The first electronic device 102 may be configured to segment the different surfaces of the 3D scene using the generated point cloud 138 based on the determined different sets of surface normals 140*a* to 140*d*. Further, the first electronic device 102 may further be configured to sense depth information of the different surfaces of the 3D scene by use of the depth sensor. The generated point cloud 138, the segmented different surfaces of the 3D scene, and the depth information may be used by the first electronic device 102 to create a local 3D map for the first room.

Figure 2:
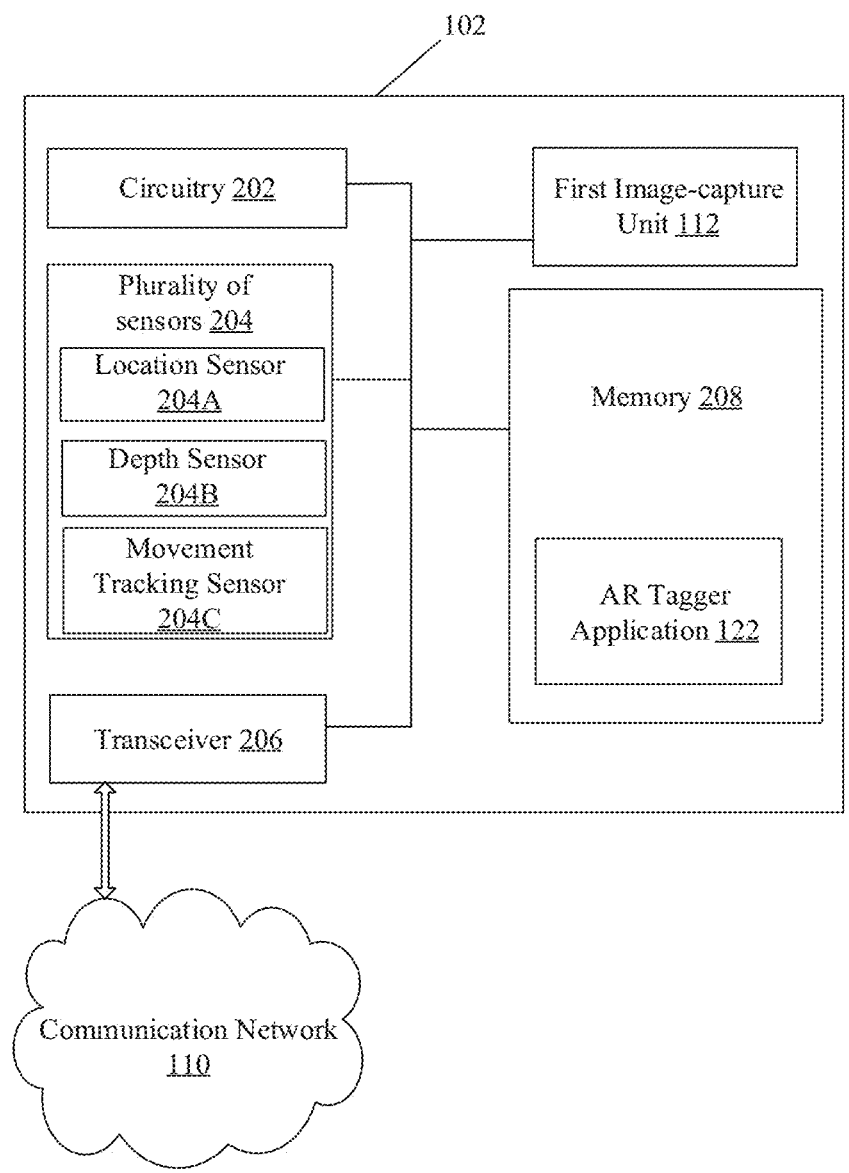
FIG. 2 is a block diagram that illustrates an exemplary augmented reality based electronic device to provide location tagging assistance in an indoor or outdoor area, in accordance with an embodiment of the disclosure.

FIG. 2 is a block diagram that illustrates an exemplary augmented reality based electronic device to provide location tagging assistance in an indoor or outdoor area, in accordance with an embodiment of the disclosure. FIG. 2 is explained in conjunction with elements from FIGS. 1A, 1B, and 1C. With reference to FIG. 2, there is shown a first electronic device 102. The first electronic device 102 may include circuitry 202, a plurality of sensors 204, a transceiver 206, the first image-capture unit 112, a memory 208, and an AR tagger application 122. The plurality of sensors 204 may comprise a location sensor 204A, a depth sensor 204B, and a movement tracking sensor 204C. The transceiver 206 may be configured to facilitate communication with other electronic devices, such as the second electronic device 106, the first server 104, and the second server 108. The circuitry 202 may be communicatively coupled to the plurality of sensors 204, the first image-capture unit 112, the transceiver 206, and the memory 208, via a system bus. The second electronic device 106 may be similar to the first electronic device 102. Hence, the aforementioned electronic devices may have similar components and functionality as that described with reference to the first electronic device 102 in FIG. 2.

The circuitry 202 may comprise suitable logic, circuit components, interfaces, and/or code that may be configured to execute a set of instructions stored in the memory 208. The circuitry 202 may be a processor. The circuitry 202 may be configured to execute a set of instructions by use of the AR tagger application 122 installed in the memory 208. Examples of the circuitry 202 may include, but are not limited to an X86-based processor, a Reduced Instruction Set Computing (RISC) processor, an Application-Specific Integrated Circuit (ASIC) processor, a Complex Instruction Set Computing (CISC) processor, a General Purpose Graphical Processor UNIT (GPGPU), a microcontroller, a microprocessor, and/or other processing circuitry or control circuits.

The plurality of sensors 204 may comprise suitable logic, circuitry, interfaces, and/or code that may be configured to sense one or more parameters and communicate the sensed one or more parameters to the circuitry 202. The plurality of sensors 204 may comprise a location sensor 204A, such as a GPS transceiver, to sense location of the first electronic device 102. The plurality of sensors 204 may further comprise the depth sensor 204B to sense depth of one or more objects in the first preview from the first electronic device 102. The movement tracking sensor 204C provides the motion tracking capability to the first electronic device 102. The movement tracking sensor 204C may sense movement and/or orientation of the first electronic device 102 as the first electronic device 102 moves from one location to another location, for example, in the defined indoor area 120. Examples of the movement tracking sensor 204C may include, but are not limited to an accelerometer, a gyroscope, ultrasonic motion sensor, a compass, an orientation sensor, or a combination thereof. In one example, the motion tracking may be performed by the circuitry 202 by use of one or more motion tracking techniques such as simultaneous localization and mapping (SLAM).

The transceiver 206 may comprise suitable logic, circuitry, interfaces, and/or code that may be configured to communicate with other electronic devices, via the communication network 110. The transceiver 206 may implement known technologies to support wireless communication. The transceiver 206 may include, but are not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 206 may communicate via offline and online wireless communication with networks, such as the Internet, an Intranet, and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), BLUETOOTH®, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The memory 208 may comprise suitable logic, circuitry, and/or interfaces that may be configured to store a set of instructions executable by the circuitry 202. The AR tagger application 122 may be installed in the memory 208. Examples of implementation of the memory 208 may include but are not limited to Random Access Memory (RAM), Read Only Memory (ROM), Hard Disk Drive (HDD), a solid-state drive (SSD), and/or a Secure Digital (SD) card.

In operation, the first electronic device 102 may create a local 3D scene map of the defined indoor area 120 with an area learning operation. In certain scenarios, to create the local 3D scene maps via the area learning operation, the first electronic device 102 may be configured to capture a plurality of images of the defined indoor area 120 with the first image-capture unit 112. In certain scenarios, the first user 116 may move within the defined indoor area 120 in order to capture the plurality of images with the first image-capture unit 112 of the first electronic device 102. The first electronic device 102 may be configured to track the relative motion of the first electronic device 102 with respect to the first reference point, as discussed in FIG. 1A.

Further, the first electronic device 102 may be configured to receive the plurality of images captured by the first image-capture unit 112, as well as the relative motion of the first electronic device 102, that is tracked during capture of the plurality of images. In one example, the first electronic device 102 may track the motion of the first electronic device 102 by use of the motion tracking techniques (such as SLAM). The motion may be tracked by feature tracking approach like SLAM (simultaneous localization and mapping) on the received plurality of images. Each of the plurality of received images captured by the first image-capture unit 112 may be processed to estimate the motion and direction of movement of the first electronic device 102. In certain scenarios, the depth sensor 204B may sense depth information associated with one or more points in vicinity of the first electronic device 102. In certain scenarios, the first electronic device 102 may be configured to use the tracked relative motion and the sensed depth information to generate 3D structures (such as point cloud) which may represent one or more portions of the defined indoor area 120. In one example, the generated 3D structures may be used by the first electronic device 102 to create a local 3D map. The created local 3D map may be used by the first electronic device 102 for annotating objects in the defined indoor area 120. Further, the created local 3D map may be used by the first electronic device 102 for navigating in the 3D space. An example of the generation of the point cloud 138 and the local 3D map using the point cloud 138, has been described in FIG. 1C.

The functions and/or operations performed by the first electronic device 102, as described in FIGS. 1A, 1B, and 1C, may be performed by the circuitry 202. Other operations performed by the circuitry 202 are further described, for example, in FIGS. 3A, 3B, 4A, 4B, and 5.

Figure 3A:
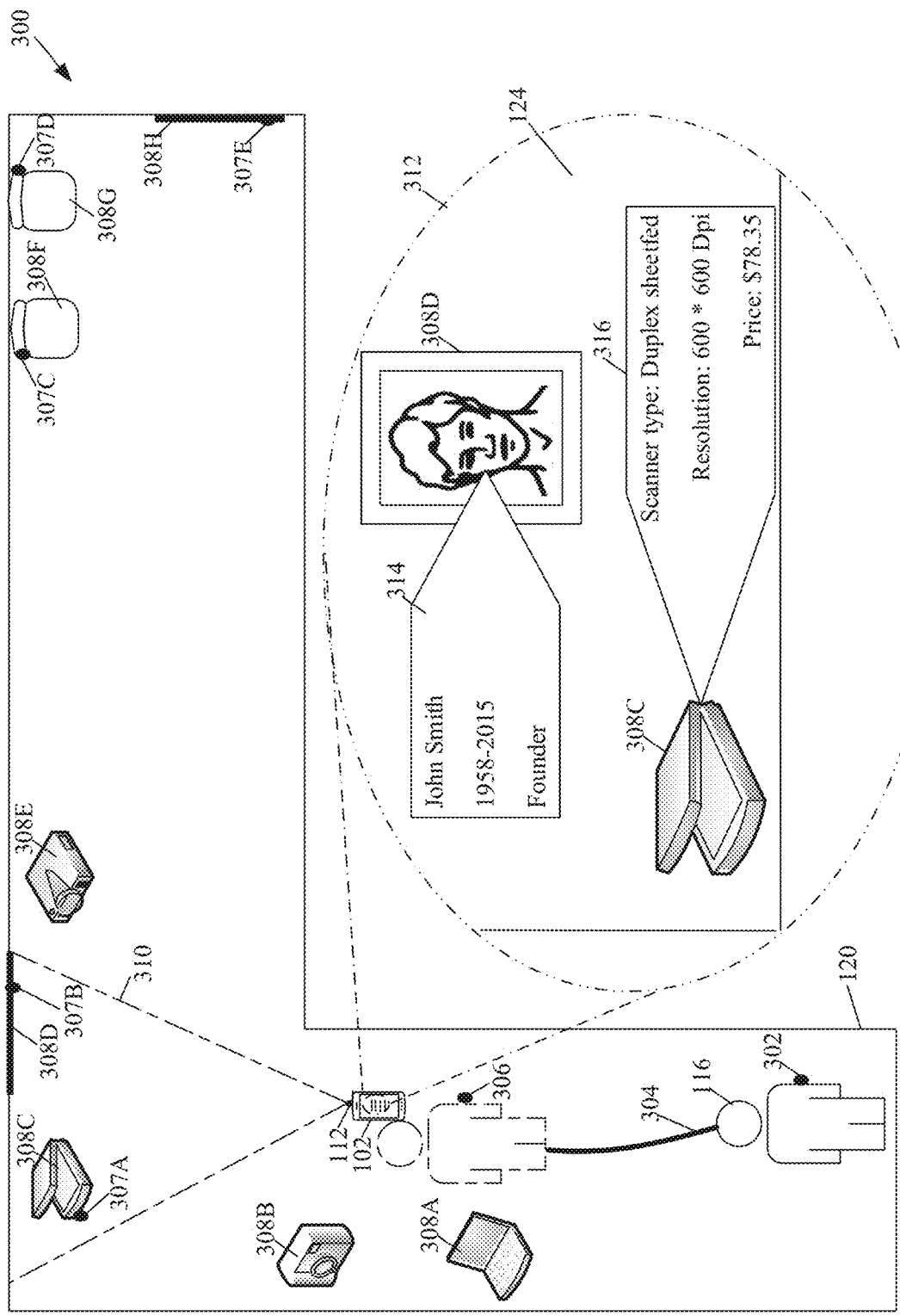
FIGS. 3A and 3B, collectively, illustrate an exemplary scenario for implementation of the disclosed augmented reality based electronic device to provide location tagging assistance in an indoor or outdoor area, in accordance with an embodiment of the disclosure.

FIG. 3A illustrates an exemplary scenario for implementation of the disclosed augmented reality based electronic device to provide location tagging assistance in an indoor or outdoor area, in accordance with an embodiment of the disclosure. FIG. 3A is explained in conjunction with elements from FIGS. 1A, 1B, 1C, and 2. With reference to FIG. 3A, there is shown the defined indoor area 120, comprising a plurality of objects (such as a laptop 308A, a camera 308B, a scanner 308C, a portrait 308D, a Liquid Crystal Display (LCD) Projector 308E, a first chair 308F, a second chair 308G, and a door 308H).

In accordance with the exemplary scenario, the first user 116 may enter an unknown area (e.g. a shopping mall) or may want to get acquainted with various objects in the defined indoor area 120. The first user 116 may hold the first electronic device 102, for example, a smartphone in this case, as the first user 116 moves in the defined indoor area 120. The exemplary scenario 300 also illustrates a magnified view 312 of the application interface 124 rendered on a display screen of the first electronic device 102. The exemplary scenario 300 also illustrates a first location of the first user 116 (marked as a first reference point 302 in the FIG. 3A), a second location 306 of the first user 116, a first position 307A of the first object (such as the scanner 308C), a second position of the second object (such as the portrait 308D), and a path 304 traversed by the first user 116 in the defined indoor area 120.

In operation, the first electronic device 102 may be configured to receive an input to launch the AR tagger application 122 installed in the first electronic device 102. The first electronic device 102 may be configured to acquire a location of the first electronic device 102 with the location sensor 204A integrated in the first electronic device 102. As discussed in FIG. 1A, the acquired location may not be accurate. The first electronic device 102 may be configured to receive an input to select the first location of the first electronic device 102 on the application interface 124. The first user 116 may select the first location, such as the user-calibrated location, on the application interface 124 of the first electronic device 102. In accordance with the exemplary scenario 300, the first electronic device 102 may be configured to determine the first reference point 302 in the defined indoor area 120 based on the selected first location. The first reference point 302 may be associated with a reference location coordinate, based on the specified geographic coordinate system (e.g. WGS). The first user 116 may hold the first electronic device 102 and traverse in the defined indoor area 120 along certain path, such as the path 304, as shown.

The first electronic device 102 may be configured to track relative motion of the first electronic device 102 with respect to the first reference point 302. The tracked relative motion may correspond to the path 304. The first electronic device 102 may be configured to compute the second location 306 of the first electronic device 102 in the defined indoor area 120, based on the tracked relative motion.

In certain scenarios, the first user 116 may come across certain objects (such as the laptop 308A, the camera 308B, the scanner 308C, the portrait 308D, and the LCD Projector 308E) in the defined indoor area 120. In such scenarios, the first user 116 may point the first image-capture unit 112 of the first electronic device 102 to capture a view of a scene that includes one or more objects. In accordance with an embodiment, the first electronic device 102 may be configured to present a live preview of the scene that comprises the one or more objects, via the application interface 124. For example, the first electronic device 102 may be configured to present the live preview of the scene in a field-of-view 310 of the first image-capture unit 112 via the application interface 124. In the exemplary scenario 300, the live preview may comprise the scanner 308C and the portrait 308D. The first electronic device 102 may be configured to acquire depth information of the scanner 308C and the portrait 308D with respect to the first electronic device 102, from the depth sensor 204B. The distances of the scanner 308C (for example, 4 meters) and the portrait 308D (for example, 5 meters) the first electronic device 102 at the second location may be calculated based on the acquired depth information. The first position 307A of the scanner 308C and the second position 307B of the portrait 308D in a specified geographic coordinate system, for example, the WGS coordinates, may be computed. The first position 307A may be computed and mapped in the specified geographic coordinate system (e.g. standard earth coordinate) based on the distance between the scanner 308C and the first electronic device 102 and a distance between the second location 306 from the first reference point 302. Based on the distance between the scanner 308C and the first electronic device 102 and the distance between the second location 306 from the first reference point 302, a distance between the scanner 308C and the first reference point 302 may be estimated. Thus, location coordinates of the first position 307A may be mapped to the specified geographic coordinate system in reference to the location coordinates of the first reference point 302.

The first electronic device 102 may be further configured to retrieve the augmented reality content from the first server 104 based on the computed first position 307A and the second position 307B. In the illustrated exemplary scenario 300, the scanner 308C may be annotated with a first augmented reality content comprising text "Scanner type: Duplex sheet feed Resolution 600*600 Price: $78.35" and the portrait 308D may be annotated with a second augmented reality content comprising text "John Smith 1958-2015 Founder".

The first electronic device 102 may control output of the augmented reality content in the live preview of the scene displayed on the application interface 124 of the first electronic device 102. As shown, for example, in the magnified view 312, a first augmented reality content 314 associated with the portrait 308D, and a second augmented reality content 316 associated with the scanner 308C may be displayed on the live preview of the scene, rendered on the application interface 124.

Figure 3B:
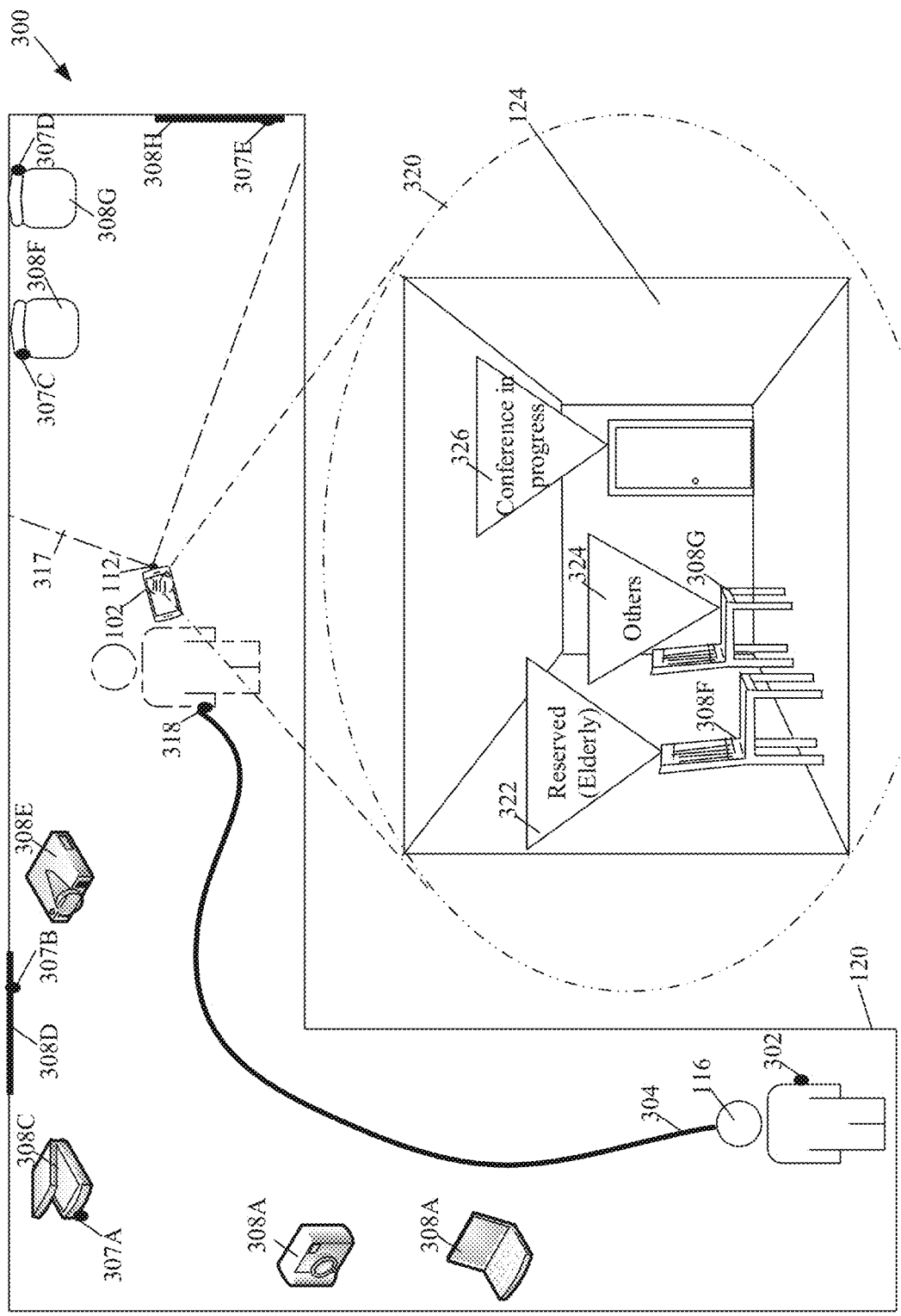

FIG. 3B illustrates an exemplary scenario for implementation of the disclosed augmented reality based electronic device to provide location tagging assistance in an indoor or outdoor area, in accordance with an embodiment of the disclosure. FIG. 3B is explained in conjunction with elements from FIGS. 1A, 1B, 1C, 2 and 3A. With reference to FIG. 3B, there is shown the defined indoor area 120, comprising the plurality of objects as discussed in FIG. 3A.

The first user 116 may further move from the second location 306 (FIG. 3A) to the third location 318 in the defined indoor area 120. The first user 116 may then point the first image-capture unit 112 of the first electronic device 102 to capture a view of a scene in a field-of-view 317 of the first image-capture unit 112. A live preview of the scene in the field-of-view 317 may be rendered via the application interface 124. In this case, the live preview may comprise the first chair 308F, the second chair 308G, and the door 308H. The first chair 308F, the second chair 308G, and the door 308H may have augmented reality contents previously annotated by some other user. The first electronic device 102 may be further configured to retrieve the augmented reality content from the first server 104 based on a search of object positions (e.g. location coordinates of a third position 307C, a fourth position 307D, and a fifth position 307E) in the specified geographic coordinate system. The annotations associated with each of the object positions (e.g. location coordinates of the third position 307C, the fourth position 307D, and the fifth position 307E) in the specified geographic coordinate system, may then be retrieved.

The first electronic device 102 may control display of the retrieved augmented reality content in the first preview of the scene on the application interface 124 of the first electronic device 102. For example, as shown in a magnified view 320, augmented reality content associated with the first chair 308F, the second chair 308G, and the door 308H, may be displayed. In the illustrated exemplary scenario 300, details of the first chair 308F may be augmented with a first augmented reality content (shown as a first label 322) for example, "Reserved for Elderly". This may indicate to the first user 116 that the first chair 308F is reserved for senior citizens. Similarly, a second augmented reality content (e.g. shown as a second label 324) comprising text "For others", may be displayed over the second chair 308G, thereby providing a guidance to the first user 116 that the second chair 308G, may be available for use for people other than senior citizens. Further, an annotation associated with the door 308H may be presented as a third augmented reality content (e.g. shown as a third label 326), for example, "Conference in progress" for a particular time instant at which the first image-capture unit 112 is pointed towards the scene. The third label 326 indicates that a conference is in progress in the conference room behind the door 308H. Thus, the first user 116 may readily get acquainted with unknown objects in the defined indoor area 120 by simply pointing the first image-capture unit 112 towards the objects, by use of the AR tagger application 122.

Figure 4A:
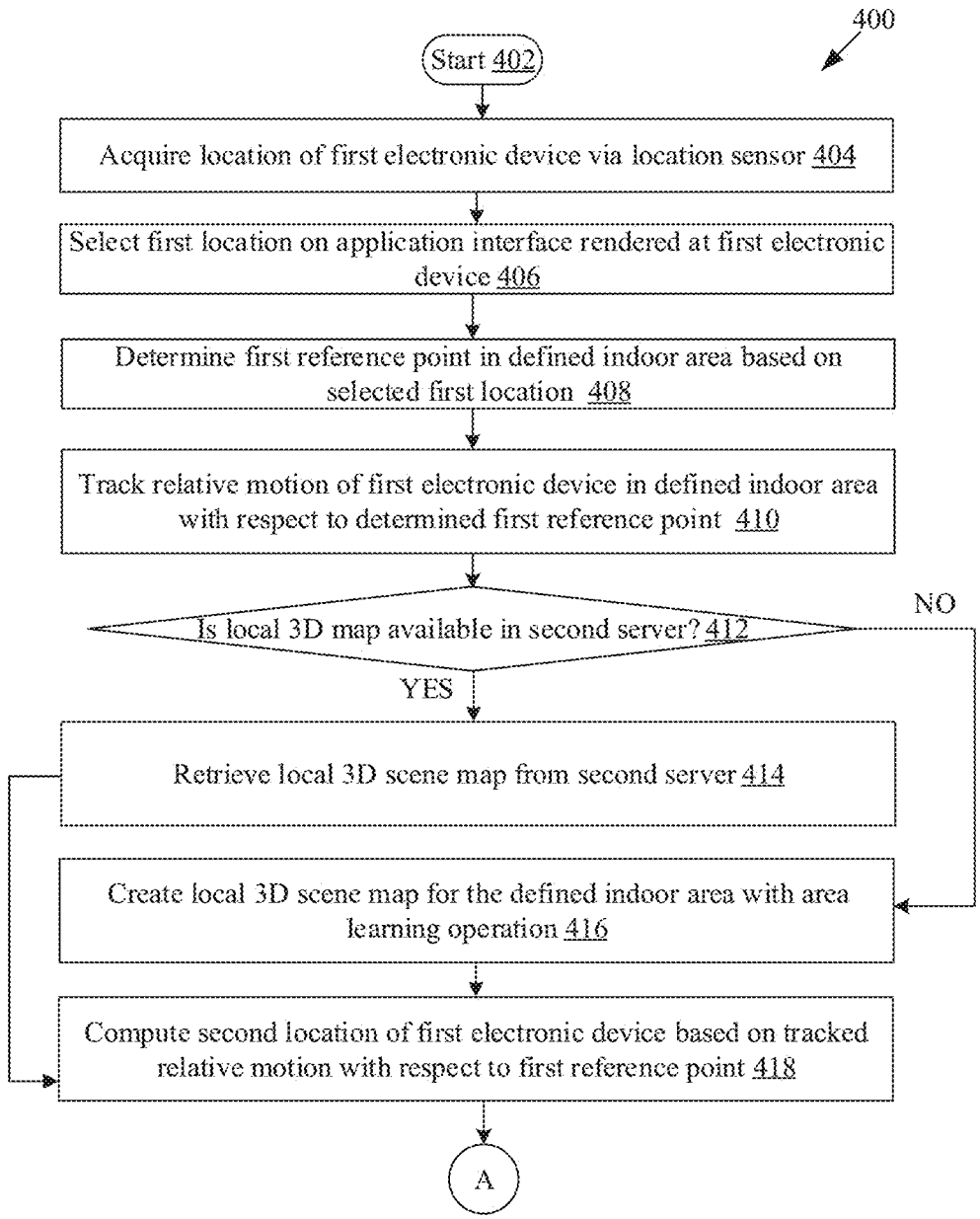
FIGS. 4A and 4B, collectively, depict a first flow chart that illustrates an exemplary method to operate augmented reality based electronic device to provide location tagging assistance in an indoor or outdoor area, in accordance with an embodiment of the disclosure.
Figure 4B:
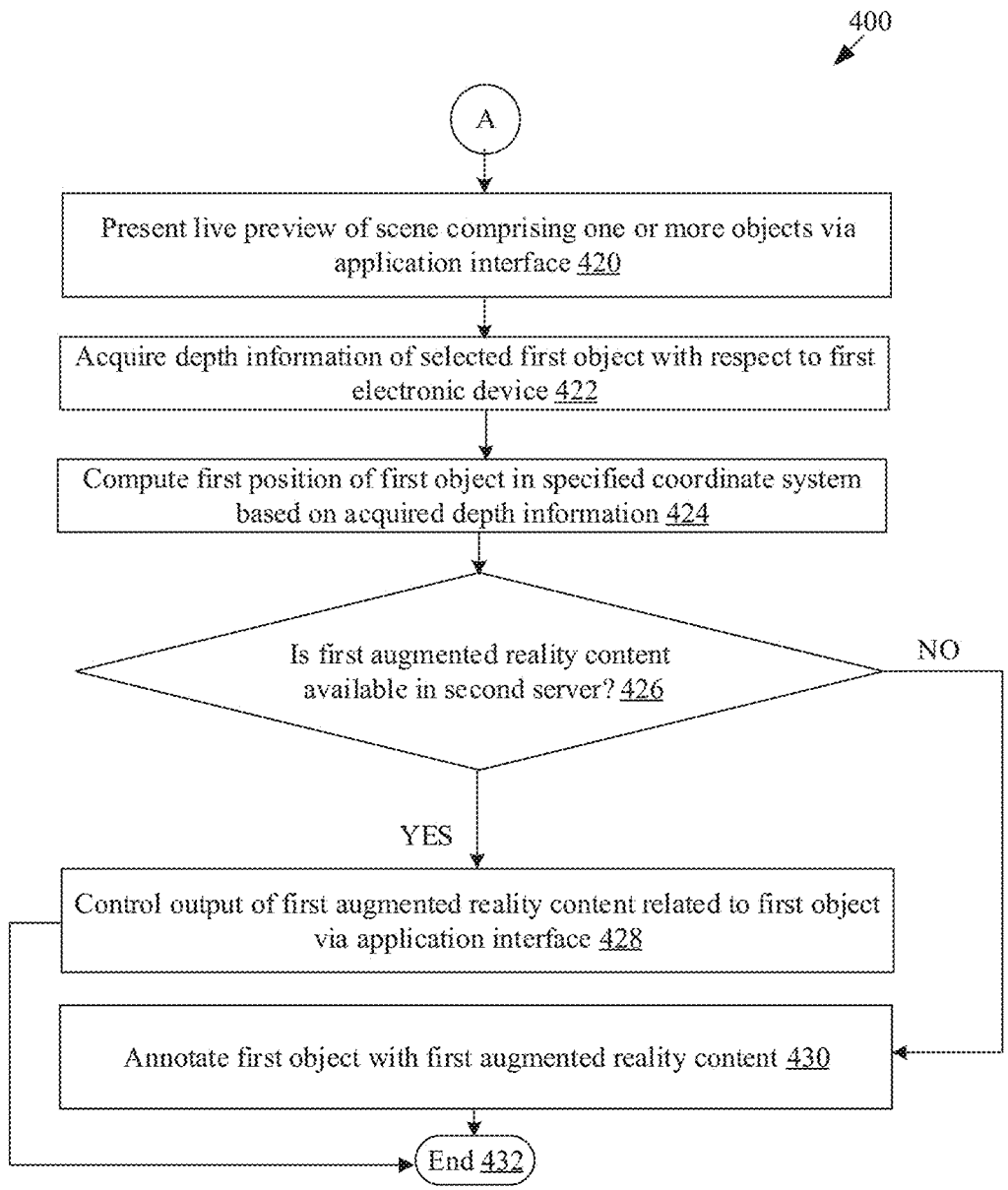

FIGS. 4A to 4B, collectively, depict a flow chart that illustrates an exemplary method to operate augmented reality based electronic device to provide location tagging assistance in an indoor or outdoor area, in accordance with an embodiment of the disclosure. FIGS. 4A and 4B are described in conjunction with FIGS. 1A, 1B, 1C, 2, 3A and 3B. With reference to FIG. 4A, the method of the flow chart 400 may be implemented in a first electronic device 102. The flow chart 400 starts at 402 and proceeds to 404.

At 404, a location of the first electronic device 102 may be acquired by the first electronic device 102 via the location sensor 204A. The circuitry 202 may be configured to acquire the location of the first electronic device 102 from the location sensor, such as the GPS sensor. The acquired location may not be an accurate location, as discussed in FIG. 1A. The location of the first electronic device 102 may be acquired based on an input to launch the AR tagger application 122 installed in the first electronic device 102.

At 406, a first location on the application interface 124 may be selected. The selection of the first location may be received by the first electronic device 102. The circuitry 202 may be configured to receive the input based on the selection of the first location on the application interface 124 of the AR tagger application 122. The first location selected on the application interface 124 may correspond to a calibrated user-location from the initial location acquired from location sensor.

At 408, a first reference point in the defined indoor area 120 may be determined by the first electronic device 102 based on the selected first location. Alternatively stated, the location coordinates for the first location may be marked by the circuitry 202 as the first reference point for later use.

At 410, a relative motion of the first electronic device 102 with respect to the determined first reference point may be tracked in the defined indoor area 120. The circuitry 202 may be configured to track the relative motion of the first electronic device 102 with respect to the determined first reference point. For example, the first user 116 may move from the first location (i.e. the first reference point 302) to a new location, such as the second location 306, in the defined indoor area 120, which may be tracked as discussed with reference to FIG. 3A.

At 412, a local 3D scene map for the defined indoor area 120 may be searched by the first electronic device 102 among local 3D maps stored in the second server 108. In a case where the local 3D map is available, the control may pass to 414, whereas if the local 3D map is unavailable, the control may pass to 416.

At 414, the local 3D scene map for the defined indoor area 120 may be retrieved by the first electronic device 102 from the second server 108. The circuitry 202 may be configured to superimpose the local 3D scene map on the application interface 124 to provision an indoor navigation guidance to the first user 116 of the first electronic device 102 in the defined indoor area 120 based on the track of the relative motion of the first electronic device 102 from the first reference point. The indoor navigation guidance may be a text based, computer graphics based, video based, and/or audio based guidance.

At 416, the local 3D scene map for the defined indoor area 120 may be created by the first electronic device 102 with an area learning operation. The circuitry 202 may be configured to create the local 3D map for the defined indoor area 120. The creation of the local 3D scene map with the area learning operation is described in details, for example, in FIG. 2.

At 418, a second location of the first electronic device 102 in the defined indoor area 120, may be computed based on the tracked relative motion of the first electronic device 102 from the first reference point. The circuitry 202 may be configured to compute the second location of the first electronic device 102 in the defined indoor area 120. The first user 116 may come across certain unknown objects in defined indoor area 120. In certain other scenarios, the first user 116 may want to get acquainted with an object in the defined indoor area 120 or seek certain information about an object-of-interest. In such scenarios, the first user 116 may point the first image-capture unit 112 of the first electronic device 102 to capture a view of a scene that includes one or more objects.

At 420, a live preview of the scene that comprises the one or more objects may be presented at the first electronic device 102 via the application interface 124. The circuitry 202 may be configured to present the live preview of the scene on the application interface 124. The one or more objects may be inanimate objects, such as consumer goods, furniture, a physical portrait, and the like. The first electronic device 102 may be configured to receive an input to select the first object in the live preview, via the application interface 124.

At 422, depth information of the first object with respect to the first electronic device 102 may be acquired from the depth sensor. The circuitry 202 may be configured to acquire depth information of the first object with respect to the first electronic device 102 from the depth sensor 204B. For example, the first user 116 may be located at the second location while the first image-capture unit 112 is pointed towards the scene. A distance of the selected first object from the first electronic device 102 at the second location may be calculated based on the acquired depth information.

At 424, a first position of the first object in a specified geographic coordinate system may be computed by the first electronic device 102 based on the acquired depth information. In accordance with an embodiment, the circuitry 202 may be configured to compute the first position in the specified geographic coordinate system based on depth information of the first object acquired from the depth sensor 204B at the second location, the second location, and the first reference point.

At 426, an availability of first augmented reality content associated with the first object may be searched in the first server 104. The circuitry 202 of the first electronic device 102 may be configured to search the availability of first augmented reality content associated with the first object in the first server 104. If the first augmented reality content associated with the first object is available in the first server 104, then the control may pass to 428 or else to 430.

At 428, output of the first augmented reality content may be controlled by the first electronic device 102 via the application interface 124 based on the first position of the first object in the defined indoor area 120. If the first augmented reality content is a user-defined annotation, an informative image, and/or an informative video, then the first electronic device 102 may be configured to superimpose a label comprising the first augmented reality content, on a preview of the first object displayed on the application interface 124, as discussed in FIG. 1A. The control may pass to end 432.

At 430, the first object may be annotated with the first augmented reality content by the first electronic device 102. The circuitry 202 may be configured to annotate the first object with one of a user-defined annotation, a UFC, a three-dimensional (3D) audio, a textual data item, 360-degree image, a 360-degree video, an informative image, and/or an informative video related to the first object, as discussed in FIGS. 1A and 1B. The control may pass to end 432.

Figure 5:
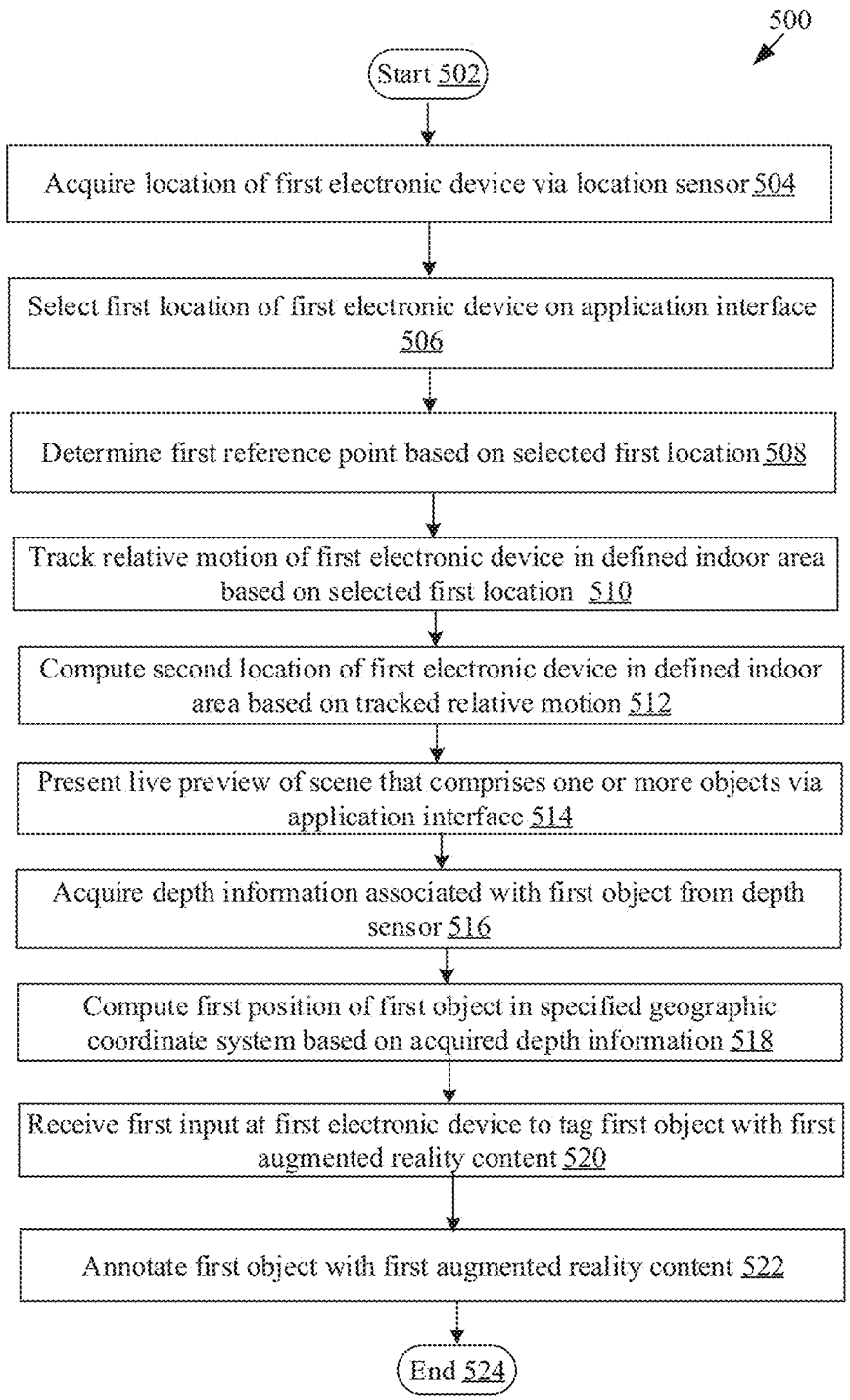
FIG. 5 depicts a second flow chart that illustrates an exemplary method to operate augmented reality based electronic device to provide location tagging assistance in an indoor or outdoor area, in accordance with an embodiment of the disclosure.

FIG. 5 depicts a flow chart that illustrates an exemplary method to operate augmented reality based electronic device to provide location tagging assistance in an indoor or outdoor area, in accordance with an embodiment of the disclosure. FIG. 5 is described in conjunction with FIGS. 1A, 1B, 1C, 2, 3A and 3B. With reference to FIG. 5, the method of the flow chart 500 may be implemented in a first electronic device 102. The flow chart 500 starts at 502 and proceeds to 504.

At 504, a location of the first electronic device 102 may be acquired by the first electronic device 102 via a location sensor. At 506, a first location on the application interface 124, may be selected. The selection of the first location on the application interface 124 may be received by the first electronic device 102. The first location selected on the application interface 124 may correspond to a calibrated user-location from the initial location acquired from location sensor.

At 508, a first reference point in the defined indoor area 120 may be determined based on the selected first location. The circuitry 202 may be configured to determine the first reference point based on the selected first location on the application interface 124. At 510, a relative motion of the first electronic device 102 in the defined indoor area 120 with respect to the determined first reference point may be tracked by the first electronic device 102.

At 512, a second location of the first electronic device 102 in the defined indoor area 120, may be computed by the first electronic device 102 based on the tracked relative motion of the first electronic device 102 from the first reference point. The first user 116 may come across certain unknown objects in defined indoor area 120. In certain other scenarios, the first user 116 may want to tag one or more objects with details about the one or more objects. In such scenarios, the first user 116 may point the first image-capture unit 112 of the first electronic device 102 to capture a view of a scene that includes one or more objects.

At 514, a live preview of the scene that comprises the one or more objects may be presented by the first electronic device 102 via the application interface 124. For example, the one or more objects may be inanimate objects, such as consumer goods, furniture, a physical portrait, and the like. The first electronic device 102 may be configured to receive an input to select the first object in the live preview, via the application interface 124.

At 516, depth information of the selected first object with respect to the first electronic device 102 may be acquired by the first electronic device 102 from the depth sensor. For example, the first user 116 may be located at the second location while the first image-capture unit 112 is pointed towards the scene. A distance of the selected first object from the first electronic device 102 at the second location may be calculated based on the acquired depth information, as discussed in the FIGS. 1A, 1B, and 1C.

At 518, a first position of the first object in a specified geographic coordinate system may be computed by the first electronic device 102 based on the acquired depth information. In accordance with an embodiment, the circuitry 202 may be configured to compute the first position in the specified geographic coordinate system based on depth information of the first object acquired from the depth sensor at the second location, the second location, and the first reference point.

At 520, a first input to tag a first object in the rendered live preview of the scene with an AR content, may be received. The circuitry 202 may be configured to receive the first input to tag the first object in the rendered live preview of the scene. In certain scenarios, the input may be received from the first user 116 via the application interface 124. The first augmented reality content may be one of a user-defined annotation, a Unique Fragrance Indicator (UFC), a three-dimensional (3D) audio, a textual data item, a 360-degree video, a 360-degree image, an informative image, and/or an informative video, as discussed in FIG. 1A.

At 522, the first object may be annotated with a first augmented reality content by the first electronic device 102. The circuitry 202 may be configured to annotate the first object with one of a user-defined annotation, a UFC, a three-dimensional (3D) audio, a 360-degree video, a 360-degree image, a textual data item, an informative image, and/or an informative video related to the first object as discussed in FIG. 1A. The control may pass to end 524.

In accordance with an embodiment of the disclosure, an augmented reality based electronic device to provide location tagging assistance in an indoor or outdoor area is disclosed. Exemplary aspects of the disclosure may include a first electronic device (such as the first electronic device 102 (FIG. 1A)) comprising an image-capture unit (such as the first image-capture unit 112 (FIG. 1A)), a depth sensor (such as the depth sensor 204B (FIG. 2)), and a circuitry (such as the circuitry 202 (FIG. 2)). The circuitry 202 may be configured to determine a first reference point (e.g. the first reference point 302 (FIG. 3A)) in a defined indoor area (such as the defined indoor area 120 (FIG. 1A)) based on a selection of a first location on an application interface (such as the application interface 124 (FIG. 1A)) rendered at the first electronic device 102. The circuitry 202 may be further configured to track a relative motion of the first electronic device 102 in the defined indoor area 120 with respect to the determined first reference point. The circuitry 202 may be configured to compute a second location of the first electronic device 102 in the defined indoor area 120 based on the track of the relative motion from the first reference point. The circuitry 202 may be configured to control output of first augmented reality content for at least a first object viewed through the first image-capture unit 112 in the defined indoor area 120, based on a first position of the first object in a specified geographic coordinate system. The first position of the first object in the specified geographic coordinate system is computed based on depth information of the first object acquired from the depth sensor 204B at the second location, the second location, and the first reference point.

Various embodiments of the disclosure may provide a non-transitory computer readable medium and/or storage medium having stored thereon, a set of instructions executable by a machine and/or a computer to provision location tagging assistance in an indoor area or an outdoor area. The at least one code section may cause the machine and/or computer to perform the operations that comprise determination of a first reference point in a defined indoor area based on a selection of a first location on an application interface rendered at the first electronic device. A relative motion of the first electronic device in the defined indoor area with respect to the determined first reference point may be tracked. A second location of the first electronic device in the defined indoor area may be computed based on the track of the relative motion from the first reference point. Output of first augmented reality content for at least a first object viewed through the image-capture unit in the defined indoor area, may be controlled based on a first position of the first object in a specified geographic coordinate system. The first position of the first object in the specified geographic coordinate system may be computed based on depth information of the first object acquired from the depth sensor at the second location, the second location, and the first reference point.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. An electronic device, comprising:
   an image-capture unit;
   a depth sensor; and
   circuitry configured to:
   determine a reference point in a defined indoor area based on a selection of a first location on an application interface rendered at the electronic device;
   track a path of the electronic device in the defined indoor area with respect to the determined reference point;
   compute a second location of the electronic device in the defined indoor area based on the tracked path from the reference point;
   compute a first position of a first object in a specified geographic coordinate system based on depth information of the first object and a distance of the second location of the electronic device from the reference point, wherein
   the depth information is acquired from the depth sensor at the second location of the electronic device, and
   the first object is in the defined indoor area and is viewed through the image-capture unit;
   determine first augmented reality content for the first object based on the first position of the first object in the specified geographic coordinate system, wherein
   the first augmented reality content is associated with a group based access level,
   the group based access level is designated, to a plurality of users, by a user of the electronic device who annotated the first object, and
   the group based access level corresponds to a level of restriction on access of the first augmented reality content; and
   control output of the determined first augmented reality content for the first object based on the group based access level.

2. The electronic device according to claim 1, wherein the first augmented reality content related to the first object corresponds to at least one of a user-defined annotation, a Unique Fragrance Code (UFC), a three-dimensional (3D) audio, a textual data item, a 360-degree video, a 360-degree image, an informative image, or an informative video related to the first object.

3. The electronic device according to claim 1, further comprising a location sensor, wherein the first location selected on the application interface corresponds to a calibrated user-location from an initial location acquired from the location sensor.

4. The electronic device according to claim 3, wherein the circuitry is further configured to:
control display of world map texture and digital terrain elevation data (DTED) as height data on the application interface based on the initial location acquired from the location sensor; and
enable the selection of the first location on the application interface based on the display of the world map texture and the DTED.

5. The electronic device according to claim 1, wherein the circuitry is further configured to determine availability of a local three-dimensional (3D) scene map for the defined indoor area based on the first location selected on the application interface.

6. The electronic device according to claim 5, wherein the circuitry is further configured to superimpose the local 3D scene map on the application interface to provide an indoor navigation guidance to the user of the electronic device in the defined indoor area, and
the indoor navigation guidance is provided based on the tracked path of the electronic device from the reference point.

7. The electronic device according to claim 1, wherein the circuitry is further configured to annotate a second object with second augmented reality content specific for the second object,
the second object is viewed through the image-capture unit in the defined indoor area, and
the annotation of the second object is based on a selection of the second object in a video stream captured by the image-capture unit in an augmented reality (AR) tagger mode and a user-input.

8. The electronic device according to claim 7, wherein the circuitry is further configured to associate the annotation of the second object with a second position in the specified geographic coordinate system of the defined indoor area.

9. The electronic device according to claim 1, wherein the circuitry is further configured to compute a distance from the first position of the first object to the second location of the electronic device, based on the depth information of the first object acquired from the depth sensor at the second location of the electronic device from where the first object is viewed through the image-capture unit.

10. The electronic device according to claim 1, wherein the circuitry is further configured to create a local three-dimensional (3D) scene map for the defined indoor area by an area learning operation, based on an absence of the local 3D scene map in a server communicatively coupled to the electronic device.

11. An electronic device, comprising:
an image-capture unit;
a depth sensor; and
circuitry configured to:
determine a reference point in a defined indoor area based on a selection of a first location on an application interface rendered at the electronic device;
track a path of the electronic device in the defined indoor area with respect to the determined reference point;
compute a second location of the electronic device in the defined indoor area based on the tracked path from the reference point;
compute a position of an object in a specified geographic coordinate system based on depth information of the object and a distance of the second location of the electronic device from the reference point, wherein
the depth information is acquired from the depth sensor at the second location of the electronic device, and
the object is in the defined indoor area and is viewed through the image-capture unit;
determine augmented reality content for the object based on the position of the object in the specified geographic coordinate system, wherein
the augmented reality content is associated with a specific access level of a plurality of access levels, and
the specific access level corresponds to a level of restriction on access of the augmented reality content; and
annotate the object with the determined augmented reality content based on the specific access level.

12. The electronic device according to claim 11, further comprising a location sensor, wherein the first location selected on the application interface corresponds to a calibrated user-location from an initial location acquired from the location sensor.

13. The electronic device according to claim 12, wherein the circuitry is further configured to:
control display of world map texture and digital terrain elevation data (DTED) as height data on the application interface based on the initial location acquired from the location sensor; and
enable the selection of the first location on the application interface based on the display of the world map texture and the DTED.

14. The electronic device according to claim 11, wherein the circuitry is further configured to determine availability of a local three-dimensional (3D) scene map for the defined indoor area based on the first location selected on the application interface.

15. The electronic device according to claim 14, wherein the circuitry is further configured to superimpose the local 3D scene map on the application interface to provide an indoor navigation guidance to a user of the electronic device in the defined indoor area, and
the indoor navigation guidance is provided based on the tracked path of the electronic device from the reference point.

16. The electronic device according to claim 11, wherein the circuitry is further configured to create a local three-dimensional (3D) scene map for the defined indoor area by an area learning operation, based on an absence of the local 3D scene map in a server communicatively coupled to the electronic device.

17. A method, comprising:
in an electronic device comprising an image-capture unit, a depth sensor, and circuitry:
determining, by the circuitry, a reference point in a defined indoor area based on a selection of a first location on an application interface rendered at the electronic device;

tracking, by the circuitry, a path of the electronic device in the defined indoor area with respect to the determined reference point;

computing, by the circuitry, a second location of the electronic device in the defined indoor area based on the tracked path from the reference point;

computing, by the circuitry, a first position of a first object in a specified geographic coordinate system based on depth information of the first object and a distance of the second location of the electronic device from the reference point, wherein the depth information is acquired from the depth sensor at the second location of the electronic device, and the first object is in the defined indoor area and is viewed through the image-capture unit;

determining, by the circuitry, first augmented reality content for the first object based on the first position of the first object in the specified geographic coordinate system, wherein the first augmented reality content is associated with a group based access level, the group based access level is designated, to a plurality of users, by a user of the electronic device who annotated the first object, and the group based access level corresponds to a level of restriction on access of the first augmented reality content; and controlling output, by the circuitry, of the determined first augmented reality content for the first object based on the group based access level.

18. The method according to claim 17, wherein the first augmented reality content related to the first object corresponds to at least one of a user-defined annotation, a Unique Fragrance Code (UFC), a three-dimensional (3D) audio, an informative image, or an informative video related to the first object.

19. The method according to claim 17, wherein the first location selected on the application interface corresponds to a calibrated user-location from an initial location acquired from a location sensor in the electronic device.

20. The method according to claim 17, further comprising:

controlling, by the circuitry, display of world map texture and digital terrain elevation data (DTED) as height data on the application interface based on an initial location acquired from a location sensor in the electronic device; and allowing, by the circuitry, the selection of the first location on the application interface based on the display of the world map texture and the DTED.

21. The method according to claim 17, further comprising determining, by the circuitry, availability of a three-dimensional (3D) scene map for the defined indoor area based on the first location selected on the application interface.

22. The method according to claim 21, further comprising superimposing, by the circuitry, the 3D scene map on the application interface to provide an indoor navigation guidance to the user of the electronic device in the defined indoor area, wherein the indoor navigation guidance is provided based on the tracked path of the electronic device from the reference point.

23. The method according to claim 17, further comprising annotating, by the circuitry, a second object with second augmented reality content specific for the second object, wherein the second object is viewed through the image-capture unit in the defined indoor area, and the annotation of the second object is based on a selection of the second object in a video stream captured by the image-capture unit in an augmented reality (AR) tagger mode and a user-input.

24. The method according to claim 23, further comprising associating, by the circuitry, the annotation of the second object with a second position in the specified geographic coordinate system of the defined indoor area.

25. The method according to claim 17, further comprising computing, by the circuitry, a distance from the first position of the first object to the second location of the electronic device, based on the depth information of the first object acquired from the depth sensor at the second location of the electronic device from where the first object is viewed through the image-capture unit.

* * * * *